(12) United States Patent
Mizutani (10) Patent No.: US 7,132,194 B2
(45) Date of Patent: Nov. 7, 2006

(54) NON-AQUEOUS ELECTROLYTIC BATTERY AND ITS MANUFACTURING METHOD

(75) Inventor: Toru Mizutani, Fukushima (JP)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 10/381,952

(22) PCT Filed: Aug. 6, 2002

(86) PCT No.: PCT/JP02/08015

§ 371 (c)(1),
(2), (4) Date: Mar. 31, 2003

(87) PCT Pub. No.: WO03/017411

PCT Pub. Date: Feb. 27, 2003

(65) Prior Publication Data

US 2003/0180605 A1    Sep. 25, 2003

(30) Foreign Application Priority Data

Aug. 6, 2001   (JP)   ............................. 2001-238033

(51) Int. Cl.
- *H01M 6/10* (2006.01)
- *H01M 6/12* (2006.01)
- *H01M 10/00* (2006.01)
- *H01M 6/14* (2006.01)

(52) U.S. Cl. .................. 429/94; 429/164; 429/162; 429/127; 429/211; 429/300; 29/623.1; 29/623.3

(58) Field of Classification Search .................. 429/94, 429/164, 162, 127, 211, 300; 29/623.1, 623.3

See application file for complete search history.

(56) References Cited

U.S. PATENT DOCUMENTS 5,989,743 A  *  11/1999  Yamashita ................. 429/129

FOREIGN PATENT DOCUMENTS

| JP | 02-262277 | | 10/1990 |
|---|---|---|---|
| JP | 05-74496 | | 3/1993 |
| JP | 09-213374 | | 8/1997 |
| JP | 10-270070 | | 10/1998 |
| JP | 2001-85000 | | 3/2001 |
| JP | 2001-109090 | | 4/2001 |
| JP | 2001-155775 | | 6/2001 |
| JP | 2001-155779 | * | 6/2001 |
| JP | 2001-155790 | | 6/2001 |

(Continued)

*Primary Examiner*—Patrick Joseph Ryan
*Assistant Examiner*—Angela J. Martin
(74) *Attorney, Agent, or Firm*—Sonnenschein Nath & Rosenthal LLP (57) ABSTRACT

A nonaqueous electrolyte battery with a higher energy density in which a useless part which has no contribution to the electromotive is reduced, and a method for manufacturing the same are provided. A positive electrode laminate (5) (a positive electrode) having a positive active material layer (2) is located in a first area which extends from an approximate center part (7) to one end on one of both sides of a separator 1, and a negative electrode laminate (6) (a negative electrode) having a negative active material layer (3) is located in a second area which extends from the approximate center part (7) to the other end on the other side which is opposite to the side having the first area of the separator (1). The separator (1) having the positive electrode laminate (5) and the negative electrode laminate (6) thereon is wound around the approximate center part (7) to constitute a wound electrode (4).

16 Claims, 8 Drawing Sheets

FOREIGN PATENT DOCUMENTS

| | | |
|---|---|---|
| JP | 2001-202965 | 7/2001 |
| JP | 2001-229974 | 8/2001 |
| JP | 2002-93404 | 3/2002 |
| JP | 2002-100408 | 4/2002 |
| JP | 2002-110126 | 4/2002 |

* cited by examiner

NON-AQUEOUS ELECTROLYTIC BATTERY AND ITS MANUFACTURING METHOD

BACKGROUND OF THE INVENTION

The present invention relates to a nonaqueous electrolyte battery and a method for manufacturing the same.

In recent years, many portable electronics devices, such as video cameras, electronic notebooks, and laptop computers (portable personal computers), become widespread, and are developed in terms of high performance, miniaturization and weight saving, and portability. Small light batteries with a high capacity have strongly been required as a portable power supply for these electronics devices. On the other hand, demands of secondary batteries, which can be recharged and repeatedly used, have been increasing, instead of primary batteries which are used once and thrown away after discharging.

Conventional secondary batteries which have generally been used are a nickel cadmium (NiCad; NiCd) battery using an alkali electrolytic solution, a lead storage battery and the like. However, the limit of a discharge voltage per cell in these conventional secondary batteries is about 1.2 V. Although various research and developments have been progressing to accomplish further improvements in their discharge capacity, output voltage, and the like, the improvements in the performances seem to reach the limit. It is practically difficult to further improve the energy density, and to accomplish the properties of the miniaturization, the weight saving, and high capacity in the nickel-cadmium battery, the lead storage battery, and the like. Also a self-discharge rate at normal temperatures in the nickel-cadmium battery, lead storage battery, and the like is generally as high as 20% or more in one month. If the batteries are charged once, left during a certain period, and then used again, an apparent discharge amount thereof is decreased due to a natural discharge, and controlling the charge amount becomes complicated, for example, an additional charge is needed before reusing the batteries, which are disadvantages.

Then, nonaqueous electrolyte secondary batteries such as a lithium ion secondary battery with excellent properties have been investigated. In these batteries, a nonaqueous solvent is used as an electrolytic solution, and a light metal such as lithium is used as a negative electrode. This provides the excellent properties: a discharge voltage of 3.7 V or more which is about three or more times of the conventional NiCd battery; a high discharge voltage property resulting in a high energy density; and a low rate of self-discharge. The lithium ion secondary battery is greatly expected to be used as a power supply for electronics devices such as electronic watches used continuously for a long period, backup power supplies for continuously storing data in various memory devices like D-RAM (Random Access Memory), calculators, cameras, and radios in addition to the above portable electronics devices like the laptop computers which requires a high capacity and a long-term charge cycle life.

Moreover, various shapes have been proposed for the lithium ion secondary battery, and thin batteries such as a sheet type battery with a thin large area, and a card type battery with a thin small area are expected to be preferably applicable to various electronics devices with a thinner shape. For example, batteries using a gel-type solid electrolyte in which an electrolyte is impregnated with a matrix polymer, and using a conductive organic macromolecule as a solid electrolyte are suggested for the thin battery. In these batteries using the solid electrolyte, a wound electrode is formed into a flat shape, and covered with an exterior material obtained by composing and laminating, for example, a polyethylene film and aluminum foil. It is expected that this can accomplish a thinner form, weight saving, and a higher energy density compared with the conventional batteries.

On the other hand, it is desired to accomplish much higher energy density in the lithium ion secondary batteries, but this requires further decreasing useless parts which do not contribute to electromotive in the wound electrode.

However, the thin batteries as described above has inherently a small thin outsurface dimension, so it is very difficult to further decrease the useless parts which do not contribute to the electromotive in the conventional nonaqueous electrolyte batteries which comprise the wound electrode composed of a positive electrode, a negative electrode, and a separator which are bonded, or laminated, and spirally wound, which is a problem.

Especially, in the conventional way, the positive electrode, the negative electrode, and the separator are simply laminated, and the separator should be wound many times to form a core of the wound electrode which is positioned approximately in a center part (approximate center part) of the wound electrode, or a core material should be used approximately in the center part. It is actually very difficult or impossible to eliminate these processes. For this reason, the core, which is composed of at least an end of the separator being wound several times, and the core material occupy a space which has no contribution to the electromotive, but they cannot be reduced nor eliminated. This also prevents the improvement in the energy density.

Moreover, the conventional wound electrode, which is formed by simply bonding the positive electrode, the negative electrode, and the separator to form an electrode laminate, and winding the laminate around the core or the core material, has a sloping shape with a cross part of a circle, an ellipse which is more circular, an oval, or a rhombus, and is less likely to be formed into a flat shape. Therefore, the wound electrode should be pressed from the upper and lower surfaces thereof and formed into a flat type one which is applicable to the thin battery. However, the original wound electrode has a shape like a cylinder, so unfortunately, distortion and stress in terms of strength of material easily occur in a process of forming it into the flat type with an even thickness.

The present invention has been achieved in view of the above problems. It is an object of the invention to provide a nonaqueous electrolyte battery with a higher energy density in which a useless part which has no contribution to the electromotive is reduced. Moreover, it is another object to provide a method for manufacturing a nonaqueous electrolyte battery which produces easily such a nonaqueous electrolyte battery.

SUMMARY OF THE INVENTION

A nonaqueous electrolyte battery according to the present invention comprises: a wound electrode where one separator, a positive electrode having a positive active material layer, and a negative electrode having a negative active material layer are wound; and a nonaqueous electrolyte with which at least the separator is impregnated, wherein the wound electrode has a structure where the positive electrode having the positive active material layer is located in a first area which extends from an approximate center part to one end on one of both sides of the separator, the negative electrode having the negative active material layer is located in a second area which extends from the approximate center part to the other end on the other side of the separator, and the separator having the positive electrode and the negative electrode thereon is wound around the approximate center part. Here, the above "one substantially seamless separator" means that the separator used for the nonaqueous electrolyte battery according to the invention includes not only one completely jointless separator but also one piece composed of two or more separators are connected each other, one sheet composed of two separators which are connected end to end, for example, with a adhesive tape, and the like.

Moreover, a method for manufacturing a nonaqueous electrolyte battery according to the present invention is used for manufacturing a nonaqueous electrolyte battery which comprises a wound electrode where one substantially seamless separator, a positive electrode having a positive active material layer, and a negative electrode having a negative active material layer are wound, and a nonaqueous electrolyte with which at least the separator is impregnated, and comprises the steps of: locating the positive electrode having the positive active material layer in a first area which extends from an approximate center part to one end on one of both sides of the separator; locating the negative electrode having the negative active material layer in a second area which extends from the approximate center part to the other end on the other side of the separator; and winding the separator which has the positive electrode and the negative electrode thereon around the approximate center part to form the wound electrode.

According to the nonaqueous electrolyte battery and the method for manufacturing the same of the present invention, the positive electrode having the positive active material layer is located in the first area which extends from the approximate center part to one end on one of the both sides of the separator, the negative electrode having the negative active material layer is located in the second area which extends from the approximate center part to the other end on the other side of the separator (that is, an approximate half area on the other end on a side opposite to the first area in the separator), and the separator having the positive electrode and the negative electrode thereon is wound around the approximate center part to form the wound electrode. A core composed of a wound end of the separator, core materials as another component, and the like are unnecessary.

Additionally, for example, using a flat plate-type jig having a slit, in the center thereof through which the separator is held, the approximate center part of the separator is tightly held through the slit, the separator is wound and bound around the jig, and the jig is removed from the wound electrode after the winding. A flat shape of the wound electrode has already been obtained in the winding step.

Moreover, when the positive electrode may be composed of the positive active material layer being applied to a positive electrode current collector, and the negative electrode may be composed of the negative active material layer being applied to a negative electrode current collector, an part, to which neither positive active material layer nor negative active material layer is applied, may be located at an outermost periphery of the wound electrode. Thereby, the active material layer on the outermost periphery of the wound electrode which has no contribution to the electromotive is eliminated, and a volume of a part corresponding thereto is further reduced.

Moreover, a lead electrode may be located in a certain position, which is on an innermost part near the approximate center part of the wound electrode, of the positive electrode and/or the negative electrode. Furthermore, the positive electrode may be composed of the positive active material layer being applied to the positive electrode current collector, and the negative electrode may be composed of the negative active material layer being applied to the negative electrode current collector, and neither positive active material layer nor negative active material layer may be applied to a position of the lead electrode. Therefore, the part which has substantially no contribution to the electromotive is eliminated, the volume of the above part is further reduced, and occurrence of irregularity of the wound electrode due to the thickness of the lead electrode is prevented.

Moreover, the nonaqueous electrolyte may be a gel-like electrolyte to further improve electromotive properties and the discharge capacity itself.

Moreover, the wound electrode may have a structure on which the wound electrode is covered with an exterior material composed of a shaped laminate film of a synthetic resin and metallic foil, a positive lead electrode is connected to the positive electrode, a negative lead electrode is connected to the negative electrode, and the positive lead electrode and the negative lead electrode are exposed from the exterior material to the exterior, to obtain a so-called flat type battery which is preferably used, for example, for cellular phones, the electronic notebooks, and the like, Moreover, the separator may have segments which are separated by the center part and on which the positive electrode on the first area and the negative electrode on the second area are respectively laminated, and one end of one of the segments near the approximate center part almost face with one end of the other segment near the approximate center part. In such a case, it is desirable to cover either or both of the ends of the segments facing each other in the approximate center part of the wound electrode with the separator, an insulating material, or insulating masking tape, in order to prevent the short circuit of the positive electrode and the negative electrode.

DETAILED DESCRIPTION OF THE PRESENTLY PREFERRED EMBODIMENTS

Embodiments of the present invention will be described in detail below with reference to accompanying drawings.

Figure 1:
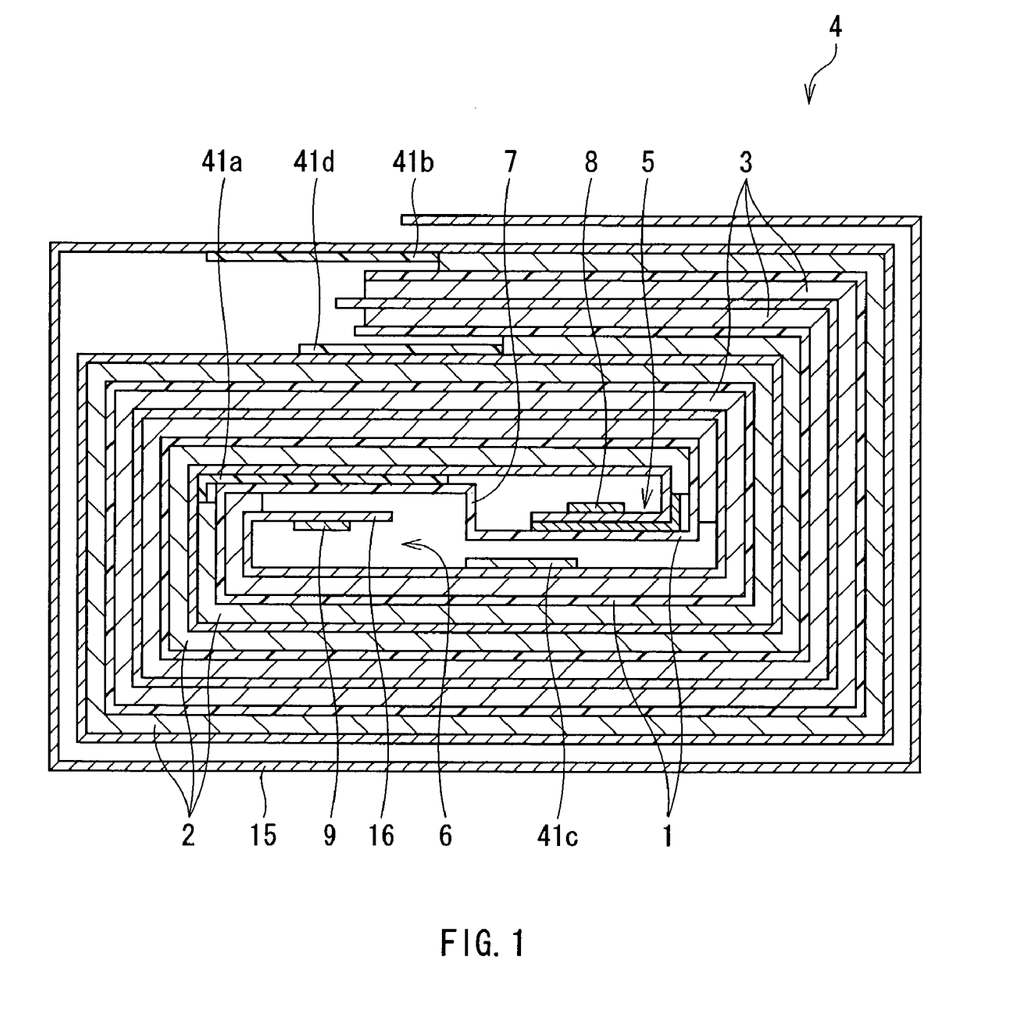
FIG. 1 is a view showing a schematic structure of a wound electrode of a lithium ion secondary battery according to an embodiment of the invention.

FIG. 1 is a view showing typically a schematic structure of a wound electrode of a flat-type lithium ion secondary battery (a nonaqueous electrolyte battery) according to an embodiment of the invention.

The lithium ion secondary battery has a principal part which consists of a wound electrode 4 consisting of one substantially seamless separator 1, a positive electrode having a positive active material layer 2, and a negative electrode having a negative active material layer 3, and a nonaqueous electrolyte (not shown) with which at least the separator 1 is impregnated. A positive electrode laminate 5 (the positive electrode) having the positive active material layer 2 is located in a first area which extends from an approximate center part 7 to one end on one of both sides of the separator 1 (for example, the outside surface). A negative electrode laminate 6 (the negative electrode) having the negative active material layer 3 is located in a second area which extends from the approximate center part 7 to the other end on the other side (the inside surface) which is opposite to the side having the first area (the outside surface). The separator 1 having the positive electrode laminate 5 and the negative electrode laminate 6 thereon is wound around the approximate center part 7 using a flat plate-like winding jig with a slit near a center for holding the separator therethrough, to constitute the wound electrode 4. A positive lead electrode 8 and a negative lead electrode 9 are located on the innermost side of the winding of the wound electrode 4. In addition, masking tapes 41a, 41b, 41c, and 41d are located in parts which are assumed to be attached to weld flash of ends of adjoining components and the like.

Figure 2:
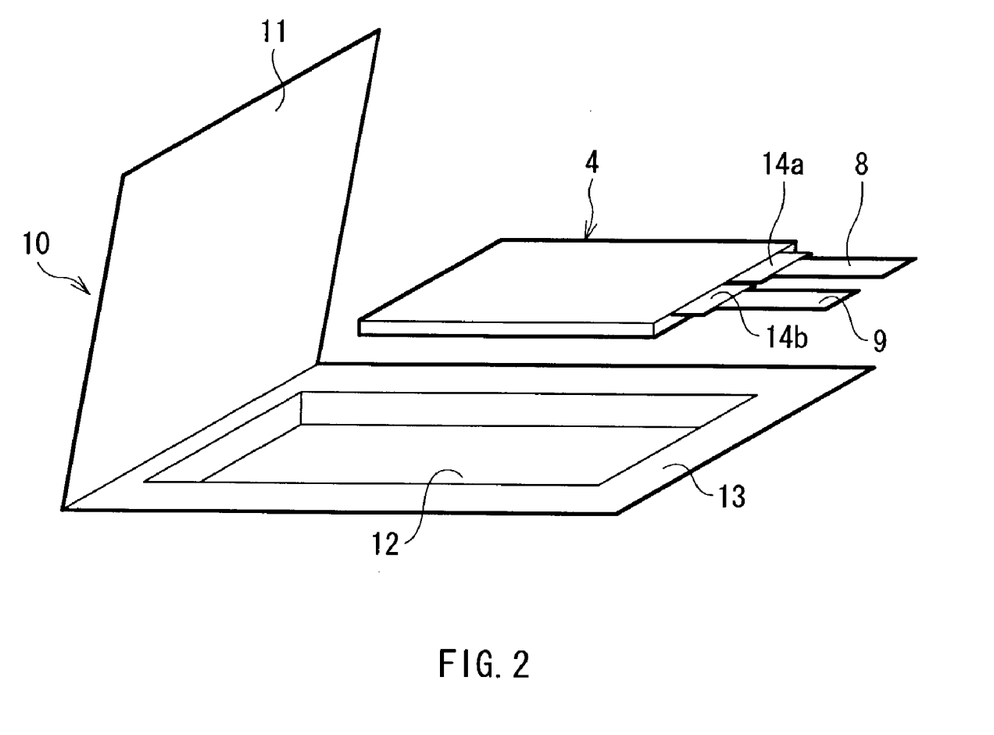
FIG. 2 is a view showing a wound electrode and an exterior container for housing the same.

The wound electrode 4 is housed in an exterior container (an exterior material) 10 as shown in FIG. 2. The exterior container 10 is a shaped laminate film in which a highly insulating polyethylene film is laminated on both sides of aluminum foil, into a flat container-shape.

Concrete materials of the exterior container 10 will be described as follows.

The materials shown below can be used as a composition of the laminate film, for example. Here, plastic materials to be used therefor are expressed by the following abbreviated names: polyethylene terephthalate:PET, molten polypropylene :PP, cast polypropylene:CPP, polyethylene:PE, low density polyethylene:LDPE, high density polyethylene:HDPE, linear low density polyethylene:LLDPE, and nylon: Ny. Moreover, AL is the abbreviation for aluminum which is a metallic material used as a barrier film with moisture permeability resistance.

The most general composition is an exterior layer/a metal film/a sealant layer=PET/AL/PE. Moreover, in addition to this composition, other general laminate film compositions as shown below can be used: a exterior layer/a metal film/a sealant layer=Ny/AL/CPP, PET/AL/CPP, PET/AL/PET/CPP, PET/Ny/AL/CPP, PET/Ny/AL/Ny/CPP, PET/Ny/AL/Ny/PE, Ny/PE/AL/LLDPE, PET/PE/AL/PET/LDPE, and PET/Ny/AL/LDPE/CPP. This is not to say that metals other than AL are applicable as the metal film.

Figure 3:
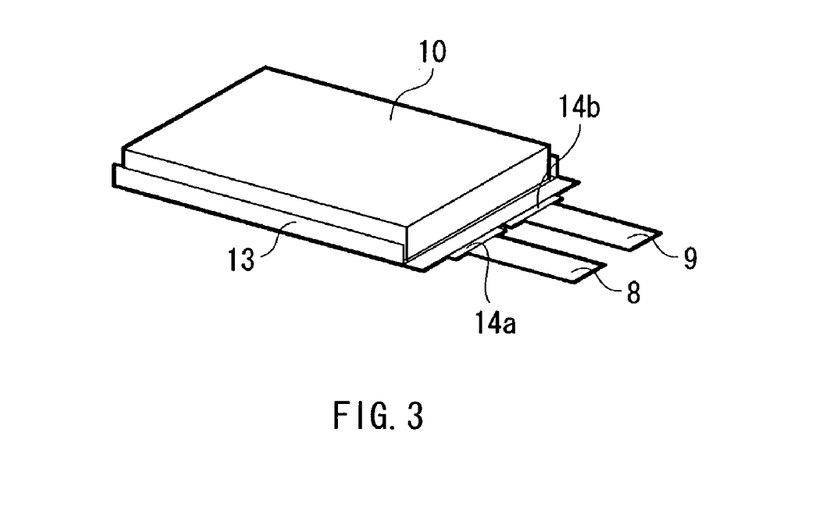
FIG. 3 is a view showing an appearance of the lithium ion secondary battery with the wound electrode shown in FIG. 1 according to an embodiment.

The exterior container 10 has a principal part consisting of a flat lid 11 and a container body 12. A periphery part of the flat lid 11 and a flange part around the container body 12 are joined together, and the wound electrode 4 is sealed therein. As shown in FIG. 3, both of the positive lead electrode 8 and the negative lead electrode 9, which project from the wound electrode 4, project out from one end of the exterior container 10. Resin films 14a and 14b are located in parts of the positive lead electrode 8 and the negative lead electrode 9 which are between the periphery part of the flat lid 11 and the flange part 13 around the container body 12. Finally the flange part 13 is bent to shape the exterior container 10 into a flat box-shape appearance as shown in FIG. 3.

Figure 4:
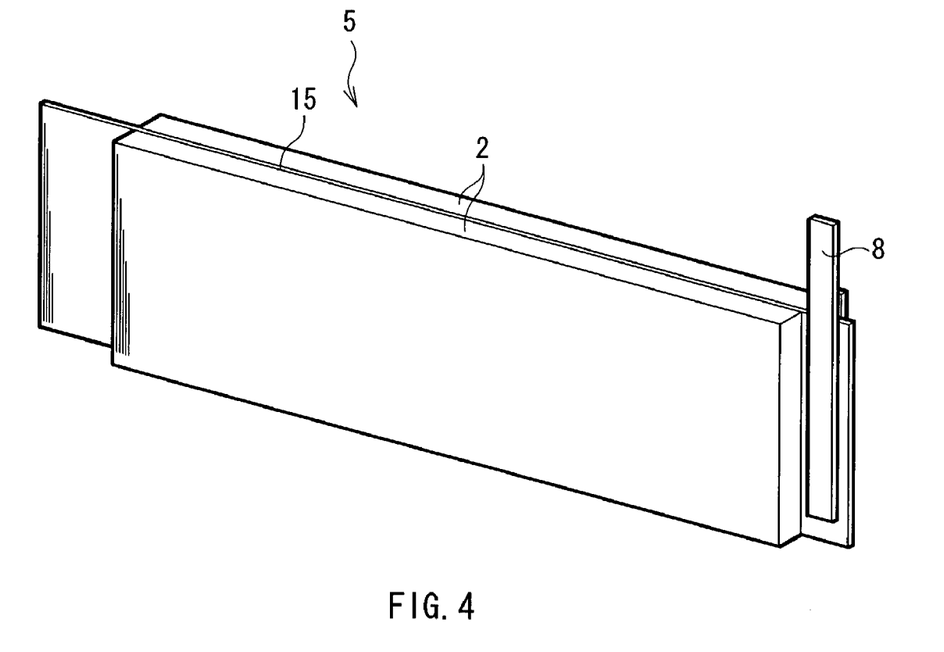
FIG. 4 is a view showing a positive electrode laminate used for the wound electrode shown in FIG. 1.

In more detail, as shown in FIG. 4, the positive electrode laminate 5 is formed by applying the positive active material layer 2 containing a positive active material to both sides of a positive electrode current collector 15.

Aluminum foil and the like can preferably be used as the positive electrode current collector 15, for example. It is desirable to use porous metal foil as the metallic foil, because this can further increase bond strength and a contact area between the positive electrode current collector 15 and the positive active material layer 2. Punching metals, expanded metals, and metallic foils with a lot of openings which are formed by etching can preferably be used as the above porous metal foil.

Materials used as the positive active material of the positive active material layer 2 depend on the type of the battery, and can include metallic oxides, metal sulfides, specific high molecular materials, and lithium composite oxides that are expressed by a general formula such as $Li_xMO_2$, for example. Here, in the above general formula, M is one or more kinds of transition metals, and X is usually a value in a range of $0.05 \leq X \leq 1.12$. Moreover, at least one kind of Co (cobalt), Ni (nickel), and Mn (manganese) is applicable as the transition metal M, for example. In addition, a general synthetic resin material or the like is sufficient as a binder used in order to form the positive active material layer 2.

Figure 5:
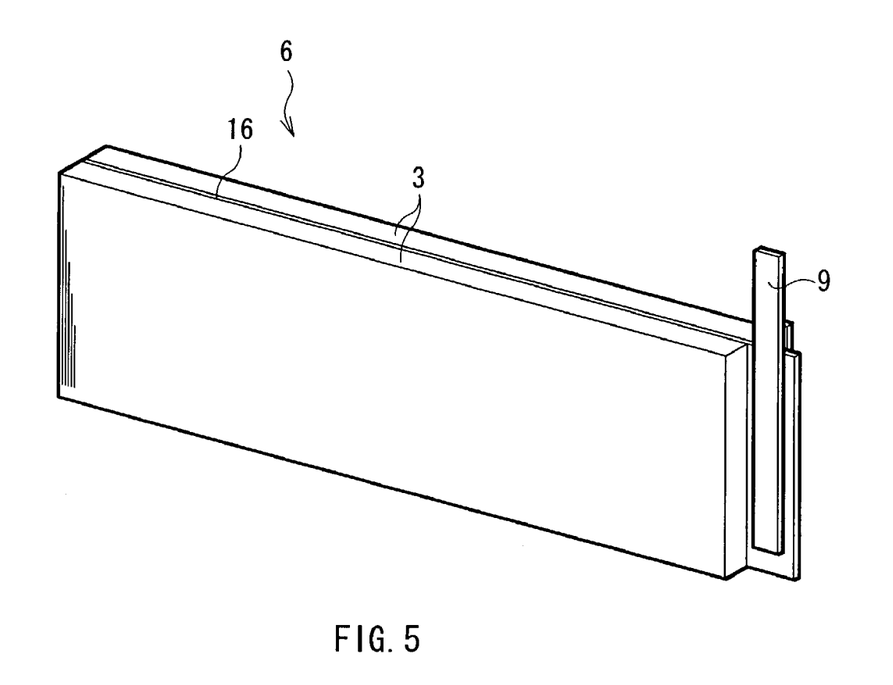
FIG. 5 is a view showing a negative electrode laminate used for the wound electrode shown in FIG. 1.

The negative electrode laminate 6 is formed by applying the negative active material layer 3 containing a negative electrode active material to both sides of a negative electrode current collector 16 as shown in FIG. 5, for example.

Copper foil or nickel foil can preferably be used as the negative electrode current collector 16, for example. The metallic foil is desirably porous metal foil because of the same reason in the case of the positive electrode current collector 15. Moreover, punching metals, expanded metals, and metallic foils with a lot of openings which are formed by etching can preferably be used as the above porous metal foil like the case of the positive electrode current collector 15.

Lithium metals, alloys of a lithium metal and other metal, or carbon materials can preferably be used as the negative electrode active material of the negative active material layer 3, for example. More specifically, materials used as the carbon material can include natural graphite, artificial graphite, non-graphitizable carbon, pyrolytic carbons, cokes (for example, pitch coke, needle coke, petroleum coke), carbon blacks such as acetylene black, glassy carbon, activated carbon, carbon fiber, organic high molecular heat treated object obtained by sintering an organic high molecular compound such as cellulose, a phenol resin, or a furan resin.

Microporous thin film, which contains a polyolefin such as polypropylene, polyethylene, or a composite thereof as a principal component, can preferably be used as the separator 1, for example. It is more preferable to use microporous thin films having wettability to an electrolyte which is improved by a surfactant or corona discharge processing.

The porosity of the separator 1 is preferably a value in a range of 30–60%, for example, but is not necessarily limited to this. This is because there are tendencies that the porosity less than 30% of the separator 1 decreases remarkably output characteristics of the battery, and that the porosity more than 60% decreases remarkably mechanical strength of the separator 1 itself. This is not to say that the porosity is not necessarily limited to such a numeric range. For example, in order to further improve the output characteristics of the battery, the porosity of 70% can be permitted despite of reduction of the mechanical strength. Moreover, an average pore size of holes of the separator 1 is preferably 1 micrometer or less in order to prevent an internal short circuit and generate a shutdown action by hole blockage more effectively, but is not necessarily limited to this. Moreover, thickness of the separator 1 is desirably a value in a range of 5–35 micrometers, for example. More desirably, the thickness may be set to a value in a range of 7–25 micrometers in light of interrelation between the mechanical strength of the separator 1 and electric resistance, but this is not to say that the value is not necessarily limited to such a range.

Materials preferably used as the nonaqueous electrolyte can include gel-like electrolytes where a nonaqueous electrolytic solution, which is produced by dissolving an electrolyte salt in a nonaqueous solvent, is gelated with a matrix polymer. $LiPF_6$, $LiClO_4$, $LiCF_3SO_3$, $LiAsF_6$, $LiBF_4$, $LiN(CF_3SO_3)_2$, $C_4F_9SO_3Li$, a mixture thereof, and the like can be used as the electrolyte salt used for the nonaqueous electrolyte. Of these materials, $LiPF_6$ is desirably used in light of ion conductivity. Moreover, an added amount of the electrolyte salt is desirably in a range of 0.1–2.0 mol/l (a mol/liter) of a concentration to the nonaqueous solvent in order to obtain good ion conductivity, but this is not to say that the electrolyte salt is not necessarily limited to the above materials and numerical range.

Polyacrylonitrile and copolymers of polyacrylonitrile can be used as a polymeric material which is used for the gel-like electrolyte, for example. Copolymerized monomers (vinyl monomers) thereof can include vinyl acetate, methyl methacrylate, butyl methacrylate, methyl acrylate, butyl acrylate, itaconic acid, methyl acrylate hydride, ethyl acrylate hydride, acrylamide, vinyl chloride, vinylidene fluoride, vinylidene chloride, for example. In addition, acrylonitrile butadiene rubber, acrylonitrile styrene-butadiene resin, acrylonitrile-polyethylene-chloride-propylene-diene-styrene resin, acrylonitrile vinyl chloride resin, acrylonitrile methacrylate resin, acrylonitrile acrylate resin, and the like can also be used. Also, polyethylene oxide and copolymers of polyethylene oxide can be used as the polymeric material which is used for the gel-like electrolyte. Copolymerized monomers thereof can include polypropylene oxide, methyl methacrylate, butyl methacrylate, methyl acrylate, butyl acrylate, for example. Polyvinylidene fluoride and copolymers of polyvinylidene fluoride can also be used as the polymeric material which is used for the gel-like electrolyte, and copolymerized monomers thereof can include hexafluoropropylene, tetrafluoroethylene, for example. In addition, one of these materials or a mixture of two or more thereof can be used as the polymeric material which is used for the gel-like electrolyte. It is more preferable that the gel-like electrolyte is formed using a high molecular compound consisting of a copolymer of polyvinylidene fluoride and polyhexafluoropropylene, and the nonaqueous electrolyte. This provides a gel-like electrolyte with high mechanical strength.

An aluminum thin plate which is processed into a strip shape with a certain dimension can be used as the positive lead electrode 8, for example. Also, a thin plate of a nickel alloy which is processed in a strip shape with a certain dimension can be used as the negative lead electrode 9, for example.

The positive lead electrode 8 is joined to a certain position of an end of the innermost surface of the positive electrode laminate 5 with welding or the like. The negative lead electrode 9 is joined to a certain position of an end of the innermost surface of the negative electrode laminate 6 with soldering, spot welding or the like.

Here, the wound structure shown in FIG. 1 is set so that the positive electrode laminate 5 may be located in an outermost periphery of the wound electrode 4. In this case, the positive active material layer 2 is not applied to an almost entire outermost periphery of an outside surface of the positive electrode laminate 5 in the outermost periphery of the wound electrode 4 (that is, an outside surface of the outermost periphery of the wound electrode 4), where the positive electrode current collector 15 is exposed. If the active material layer exists in the outermost periphery, it has substantially no contribution to electromotive as a battery. Thus such a useless part is eliminated as described above, which provides achievement of further reducing a volume and weight of the battery. Also, for the same purpose, the positive active material layer 2 is not applied to a position where the positive lead electrode 8 is located on the positive electrode current collector 15, and the negative active material layer 3 is not also applied to a position where the negative lead electrode 9 is located in the negative electrode current collector 16. The positive lead electrode 8 and the negative lead electrode 9 have joint parts with such a structure, which provides also an effect of obtaining a flatter outer shape of the wound electrode 4.

Any film or thin plate having damp proofing is usable as a formation material of the exterior container 10, and, for example, an exterior material film with a three-layer structure, where a nylon film, aluminum foil, and a polyethylene film are laminated in this order, can preferably be used.

The lithium ion secondary battery with the above schematic structure is produced as follows.

First, the positive electrode laminate 5 and the negative electrode laminate 6 having the laminated structures as described above are produced. Specifically, powder of the positive active material such as the above material is homogeneously mixed, if needed, with conductive reinforcing agent like carbon black or graphite, and a binding agent like polyvinylidene fluoride. And a solvent such as dimethyl formaldehyde or n-methyl pyrolidone and other additives are added to prepare a paste-like positive electrode mixture. Then, the mixture is uniformly applied to both sides of the positive electrode current collector 15 composed of a processed aluminum thin plate, and is dried to form the positive active material layer 2. Here, the positive active material layer 2 is not intentionally applied to the certain position of the end which is set to be located near the innermost side of the wound electrode 4 in the positive electrode laminate 5, in order to provide a bonding part for joining the positive lead electrode 8 where the surface of the positive electrode current collector 15 is exposed. The positive active material layer 2 is not intentionally applied to an part which is set to be located in the almost entire outermost periphery of the wound electrode 4 in the positive electrode laminate 5 to provide a space where the outside surface of the positive electrode current collector 15 is exposed, in order to reduce the volume and weight of the useless part which has no contribution to the electromotive. Then, the positive lead electrode 8 is joined to the bonding part.

In such a way, the positive electrode laminate (the positive electrode) 5 as shown in FIG. 4 can be produced.

In addition, in the case of the secondary battery using a gel electrolyte layer, which is not shown, it is also desirable that a sol electrolyte, where a nonaqueous electrolyte is dissolved in an added matrix polymer, is applied to a surface of the positive active material layer 2 and cooled for curing, in order to further laminate and form the gel electrolyte layer.

On the other hand, for forming the negative electrode laminate 6, powder of the negative active material such as the above material is uniformly mixed with a binding agent like polyvinylidene fluoride, and further a solvent such as dimethyl formaldehyde or n-methyl pyrolidone, an additive, and the like are added to prepare a paste-like negative electrode mixture. And the mixture is uniformly applied to both sides of the negative electrode current collector 16 composed of a processed nickel alloy thin plate, and is dried to form the negative active material layer 3. Here, the negative active material layer 3 is not intentionally applied to the certain position of the end which is set to be located near the innermost side of the wound electrode 4 in the negative electrode laminate 6, in order to provide a bonding part for joining the negative lead electrode 9 where the surface of the negative electrode current collector 16 is exposed. Then, the negative lead electrode 9 is joined to the bonding part.

In such a way, the negative electrode laminate (the negative electrode) 6 as shown in FIG. 5 can be produced.

In addition, in the case of the secondary battery using the gel electrolyte layer, which is not shown, it is also desirable that a sol electrolyte, where a nonaqueous electrolyte is dissolved in an added matrix polymer, is applied to a surface of the negative active material layer 3 and cooled for curing, in order to further laminate and form the gel electrolyte layer. It is also desirable to apply a sol-like electrolyte and cool it for curing to laminate and form the gel electrolyte layer.

Figure 6:
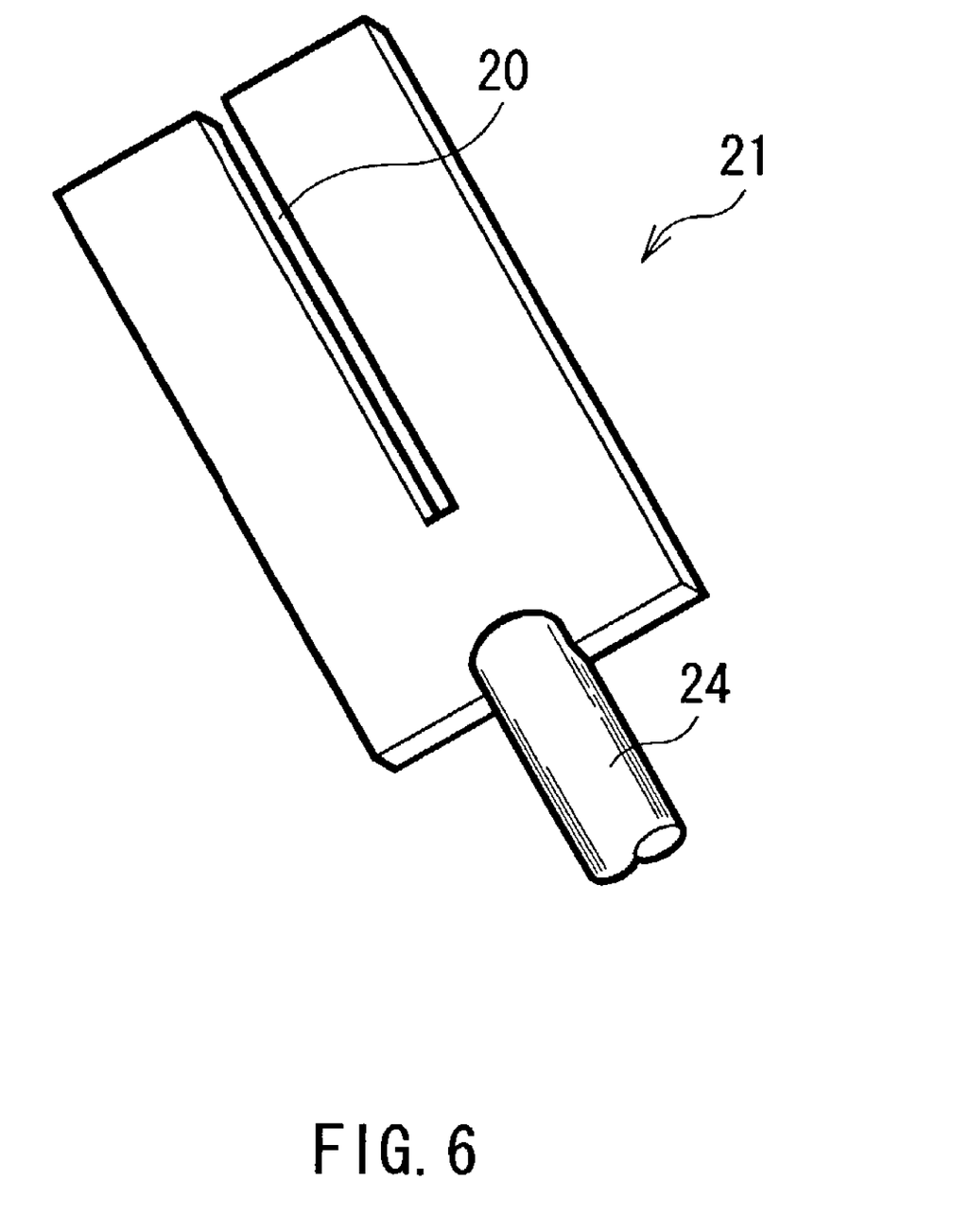
FIG. 6 is a view showing an example of a jig used for winding the separator, the positive electrode laminate, and the negative electrode laminate to produce the wound electrode.

The negative electrode laminate 6 and the positive electrode laminate 5 are produced as described above, and those and the separator 1 are impregnated with the nonaqueous electrolytic liquid (or this impregnation may be performed after forming the wound electrode 4). After that, the jig 21 for the winding which is plate-like and has the slit (gap) 20 in a position of a rotation center for holding the separator 1 therethrough is prepared like an example shown in FIG. 6.

Figure 7A:
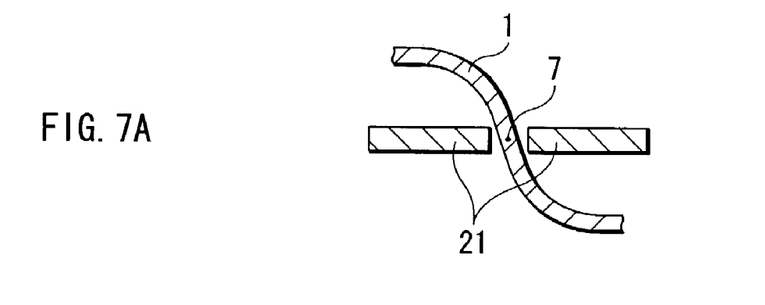
FIGS. 7A to 7D are views showing steps of winding the separator, the positive electrode laminate, and the negative electrode laminate to produce the wound electrode.

And the separator 1 is inserted through the slit 20 of the jig 21, and the approximate center part 7 of the separator 1 is pinched through the slit 20 of the jig 21 with moderate force as shown in FIG. 7A.

Figure 7B:
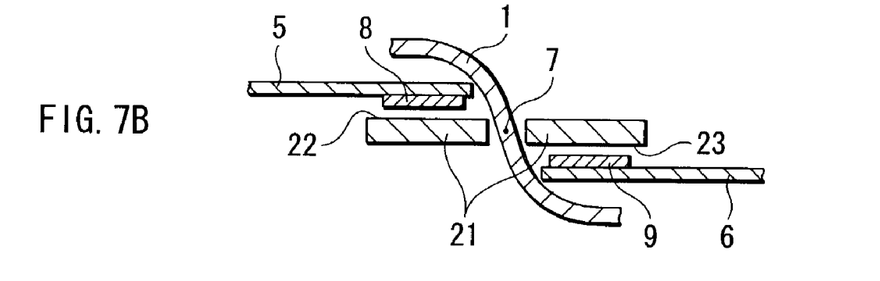

Then, as shown in FIG. 7B, moderate soft tensile force is leftwards applied to a left half area from the center part 7 of the separator 1 which is pinched by the slit 20 of the jig 21, and moderate soft tensile force is rightwards applied to a right half area from the center part 7 of the separator 1. The positive electrode laminate 5 is inserted between the lower surface (the first area) of the left half area from the center part 7 of the separator 1 and a upper surface 22 on the left of the slit 20 of the jig 21, and the negative electrode laminate 6 is inserted between the upper surface (the second area) of the right half area from the center part 7 of the separator 1 and a lower surface 23 on the right of the slit 20 of the jig 21.

Figure 7C:
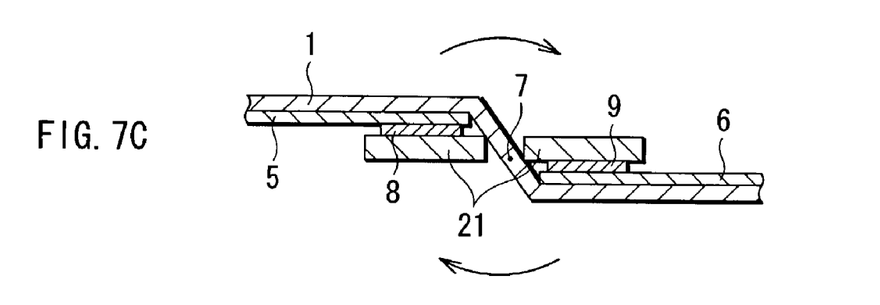
Figure 7D:
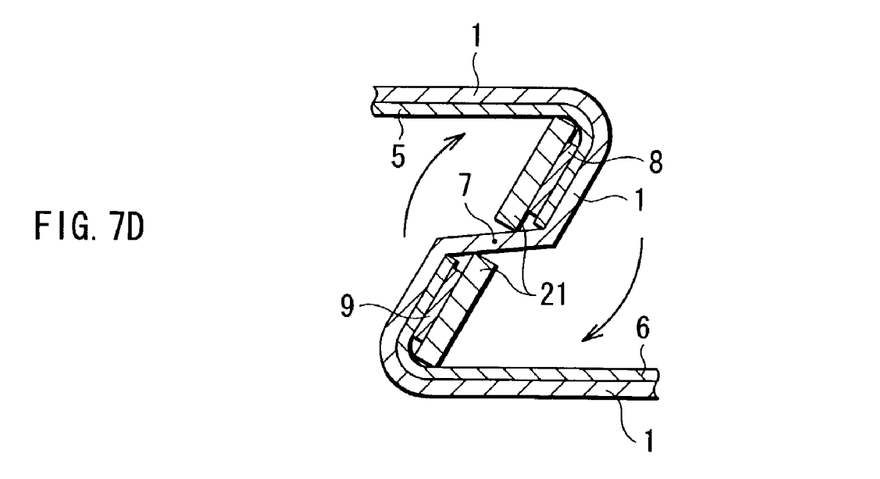

Then, as shown in FIG. 7C, tensile force with moderate strength is applied to right and left of the separator 1 without damaging the separator 1 to surely hold the innermost ends of the positive electrode laminate 5 and the negative electrode laminate 6 between the jig and the separator 1. Then, the jig is rotated in the right direction (clockwise rotation) on a rotation axis 24 which is located in alignment with the slit 20, and the separator 1, the positive electrode laminate 5, and the negative electrode laminate 6 are wound around the jig 21 and bound to it, as shown in FIG. 7D. After finishing the winding, the jig 21 is removed from the wound electrode 4 to complete the wound electrode 4.

This provides the wound electrode 4 sufficiently with the flat shape, and if needed, moderate press force may further be applied from the upper and lower surfaces of the wound electrode 4 to accomplish more perfect flat shape.

The wound electrode 4 as shown in FIG. 1 can be produced as described above. In the wound electrode 4 which is wound by such a procedure, compared with the conventional case (which is not shown) of using a core composed of a wound end of the separator 1, or a core material for a center part, the core and the core material is eliminated, and the volume and weight corresponding to them can be reduced. Consequently, the reducing the thickness of the secondary battery, for example, to 160 μm can be accomplished maintaining the same discharge capacity can be accomplished. Furthermore, the winding using the plate-like jig 21 provides the formation of the wound electrode 4 with the flat shape simultaneously in the winding step, which can avoid or eliminate distortion and stress (residual stress) in terms of strength of material which is generated in a process of performing of press working of the wound electrode into the flat shape with the even thickness with the conventional technique.

The wound electrode 4 produced as described above is housed in the exterior container 10, and the periphery part of the flat lid 11 and the flange part 13 around the container body 12 are bonded and sealed with thermocompression bonding or the like. At this time, both of the positive lead electrode 8 and the negative lead electrode 9, which project from the wound electrode 4, project out from one end of the exterior container 10. And the electric insulating resin films 14 are disposed respectively on the parts of the positive lead electrode 8 and the negative lead electrode 9 which are between the periphery part of the flat lid 11 and the flange part 13 around the container body 12. This is because when the electric insulating resin films 14 are disposed in the parts where the exterior container 10 may be contacted with the positive lead electrode 8 and the negative lead electrode 9, an electric short circuit or the like due to the metal weld flash of the laminate film which is the formation material of the exterior container 10 can surely be prevented, and the sealing performance and the adhesiveness in the parts where the positive lead electrode 8 and the negative lead electrode 9 project out from the exterior container 10 can be obtained more surely.

Figure 8:
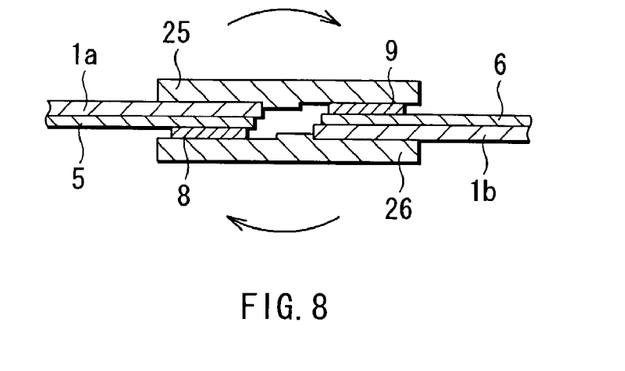
FIG. 8 is a view showing an example of a jig used for winding a separator having pre-separated segments with a first area and a second area.
Figure 9:
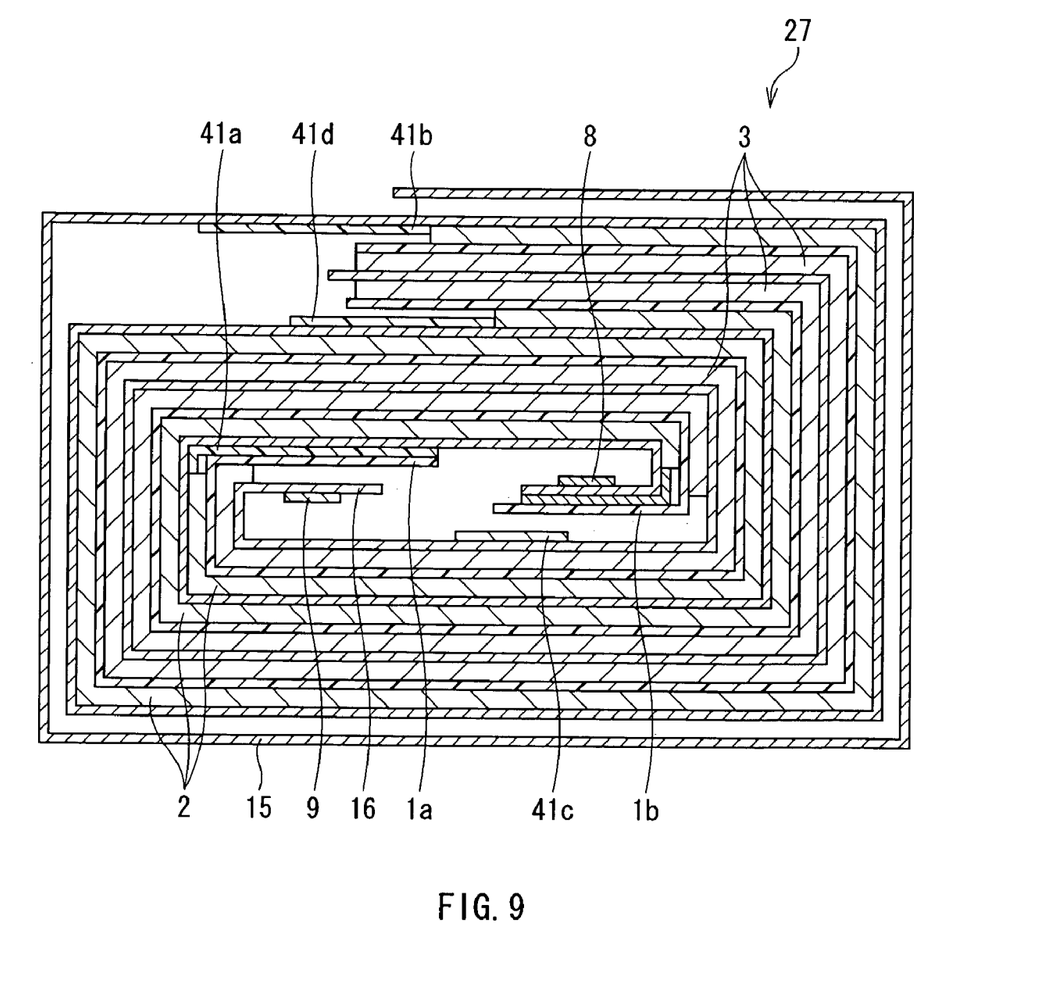
FIG. 9 is a view showing the wound electrode produced by winding the separator having the pre-separated segments with the first area and the second area.

Furthermore, the separator 1 is not limited to one seamless piece, and may be composed of segments which are separated by the center part 7 (the center position for the winding). Namely, a wound electrode 27 as shown in FIG. 9 may be produced by forming completely separated two sheets, which respectively have a laminate of a separator 1a and the positive electrode laminate 5 on the first area (the left half area in the figure) and a laminate of a separator 1b and the negative electrode laminate 6 on the second area (the right half area in the figure), and for example, holding the sheets between two jigs 25 and 26 such as an example shown in FIG. 8, winding the sheets and removing the jigs 25 and 26 after finishing the winding.

Figure 10:
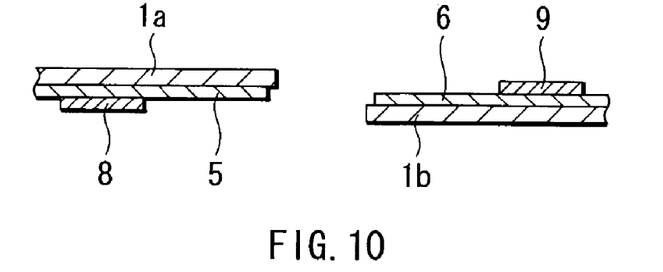
FIG. 10 is a view showing a center part of the wound electrode produced by winding the separator having the pre-separated segments with the first area and the second area.
Figure 11:
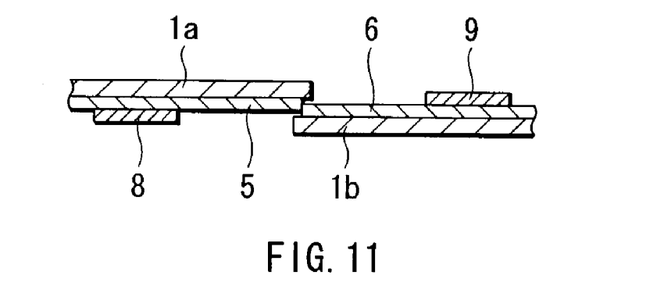
FIG. 11 is a view showing an example of a state of generating an electrical short circuit where an end face of the positive electrode laminate is attached to an end face of the negative electrode laminate in the wound electrode shown in FIG. 9.
Figure 12:
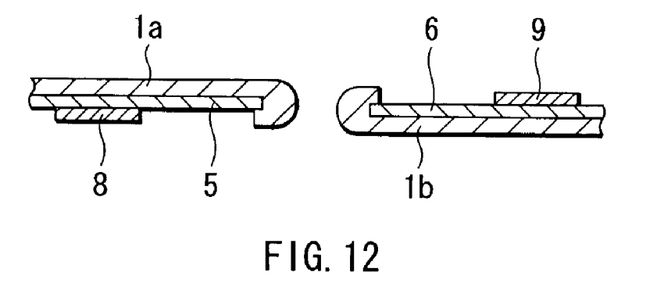
FIG. 12 is a view showing an example of the wound electrode shown in FIG. 9 where the end face of the positive electrode laminate and the end face of the negative electrode laminate are covered respectively with ends of the segments of the separator.
Figure 13:
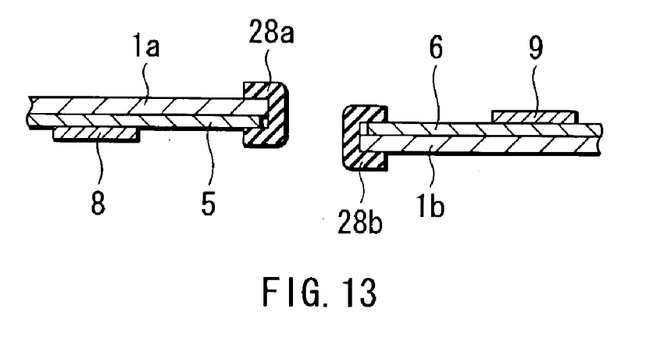
FIG. 13 is a view showing an example of the wound electrode shown in FIG. 9 where the end face of the positive electrode laminate and the end face of the negative electrode laminate are covered with an insulating tape.

In such a case, it should be noticed that ends of the positive electrode laminate 5 and the negative electrode laminate 6 face substantially each other in the center part 7 as shown in FIG. 10, so the end of the positive electrode laminate 5 may be contacted with the end of the negative electrode laminate 6 as shown in FIG. 11 and an electrical short circuit may occur, when the wound electrode 27 is pressed, or when the press force is applied to it from the exterior. Therefore, in order to prevent such an electrical short circuit, for example, it is desirable to cover the ends of the positive electrode laminate 5 and the negative electrode laminate 6 with ends of the separator 1a and the separator 1b like an example as shown in FIG. 12. Or the ends of the positive electrode laminate 5 and the negative electrode laminate 6 may be covered with insulating tapes 28a and 28b like an example as shown in FIG. 13.

Figure 14:
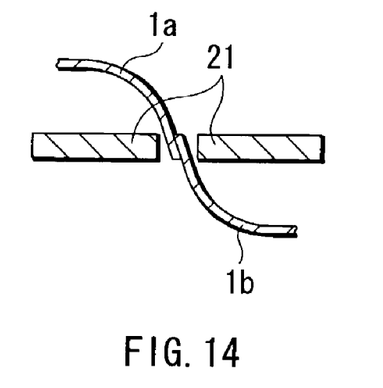
FIG. 14 is a view showing an example of substantially one piece of the separator where two separators are bonded each other.
Figure 15:
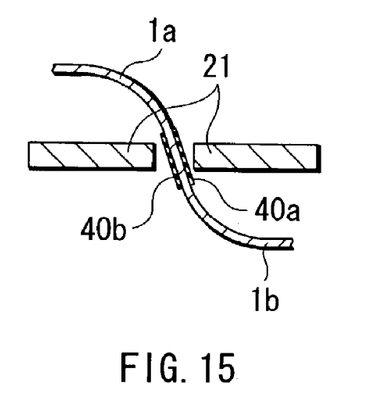
FIG. 15 is a view showing an example of substantially one piece of the separator where two separators are bonded each other with an adhesive tape.

Alternatively, the two separators 1a and 1b may be bonded each other as shown in FIG. 14, or the two separators 1a and 1b may be bonded each other, for example, with adhesive tapes 40a and 40b as shown in FIG. 15, in order to form substantially one piece separator which can be used as the above separator 1.

In the above embodiment, the case where the technique of this invention is applied to the flat type lithium ion secondary battery has been described, but other shape such as a square shape can be used as the outer shape of the battery.

Moreover, the structure where the positive lead electrode 8 and the negative lead electrode 9 are located on the innermost side of the wound electrode 4 has been described in the above embodiment, but they may be located on the outermost periphery. Alternatively, one of the positive lead electrode 8 and the negative lead electrode 9 may be located on the outermost periphery, and the other may be located on the innermost periphery.

Figure 16:
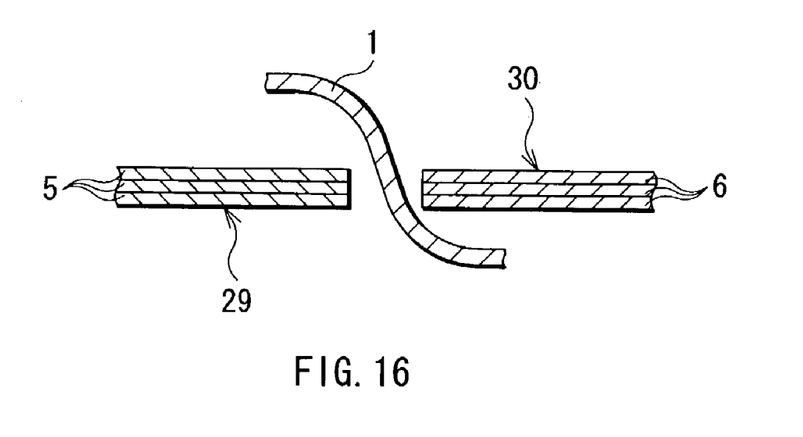
FIG. 16 is a view showing an example where a multilayer positive electrode laminate, a multilayer negative electrode laminate, and a separator are wound to form the wound electrode.

Moreover, each of the positive electrode laminate and the negative electrode laminate is composed of the active material which is applied to both sides of one piece of the current collector in the above embodiment. In addition to this, for example, like an example as shown in FIG. 16, plurality of the positive electrode laminates 5 and the negative electrode laminates 6, where each has the active material being applied to both sides of one piece of the current collector, are prepared, the plurality of the positive electrode laminates 5 are laminated to form a multilayer positive electrode laminate 29, the plurality of the negative electrode laminates 6 are laminated to form a multilayer negative electrode laminate 30, and these multilayer positive electrode laminate 29 and multilayer negative electrode laminate 30 are respectively inserted into parts between one piece of the separator 1 and the jig 21, and are wound.

Moreover, this is not to say that the lithium ion secondary battery described in the above embodiment may be used like primary batteries.

As described above, according to the nonaqueous electrolyte battery and the method for manufacturing the nonaqueous electrolyte battery of the invention, the positive electrode having the positive active material layer is located in the first area which extends from the approximate center part to one end on one of both sides of the separator, the negative electrode having the negative active material layer is located in the second area which extends from the approximate center part to the other end on the other side of the separator which is opposite to one side of both sides of the separator, and the separator having the positive electrode and the negative electrode thereon is wound around the approximate center part to obtain the wound electrode. Therefore, the core composed of the wound end of the separator, the core materials as another component, and the like are unnecessary for the approximate center part of the wound electrode, and the useless part which has no contribution to the electromotive can further be reduced, and higher energy density can be accomplished.

Moreover, according to the nonaqueous electrolyte battery and the method for manufacturing the nonaqueous electrolyte battery of one aspect of the invention, the positive electrode is composed of the positive active material layer being applied to the positive electrode current collector, and the negative electrode is composed of the negative active material layer being applied to the negative electrode current collector, the part, to which neither positive active material layer nor negative active material layer is applied, may be located at the outermost periphery of the wound electrode. This can eliminate the active material layer on the outermost periphery of the wound electrode, which has no contribution to the electromotive, and reduce further the volume of the part corresponding thereto, resulting in the accomplishment of the higher energy density.

Moreover, according to the nonaqueous electrolyte battery and the method for manufacturing the nonaqueous electrolyte battery of another aspect of the invention, the lead electrode is located in the certain position, which is on the innermost part near the approximate center part of the wound electrode, on the positive electrode and/or the negative electrode, the positive electrode is composed of the positive active material layer being applied to the positive electrode current collector, and the negative electrode is composed the negative active material layer being applied to the negative electrode current collector, neither positive active material layer nor negative active material layer is applied to the position of the lead electrode. This can eliminate the part which has substantially no contribution to the electromotive, reduce further the volume of the above part, and prevent the occurrence of irregularity of the wound electrode due to the thickness of the lead electrode.

Moreover, according to the nonaqueous electrolyte battery and the method for manufacturing the nonaqueous electrolyte battery of still another aspect of the invention, the nonaqueous electrolyte is the gel-like electrolyte, so electromotive properties and the discharge capacity itself can be improved further.

Moreover, according to the nonaqueous electrolyte battery and the method for manufacturing the nonaqueous electrolyte battery of still another aspect of the invention, using the flat plate-type jig having the slit in the center thereof which the separator is held through, the approximate center part of the separator is tightly held through the slit, the separator is wound and bound around the jig to form the wound electrode and the jig is removed from the wound electrode after the winding. This allows the wound electrode with the flat shape to be formed simultaneously in the winding step, and which can avoid or eliminate distortion and stress (residual stress) in terms of strength of material which is generated in the process of processing it into the flat shape having the even thickness with the conventional technique.

Obviously many modifications and variations of the present invention are possible in the light of the above description. It is therefore to be understood that within the scope of the appended claims the invention may be practiced otherwise than as specifically described.

The invention claimed is:

1. A nonaqueous electrolyte battery comprising:
a wound electrode assembly and a non aqueous electrolyte, wherein the wound electrode assembly comprises:
a separator impregnated with the nonaqueous electrolyte,
a positive electrode connected to a positive lead electrode having a positive active material layer located in a first area of the wound electrode assembly,
a negative electrode connected to a negative lead electrode having the negative active material layer located in a second area of the wound electrode assembly, and
a center part between the first area and second area around which the separator is wound, wherein,
the first area extends from the center part toward a first end of the wound electrode assembly on a first side of the separator,
the second area extends from the center part toward a second end of the wound electrode assembly on a second side of the separator,
the wound electrode assembly is covered with an exterior material comprising a shaped laminate film of a synthetic resin and metallic foil,
the positive lead electrode and the negative lead electrode are exposed through the exterior material, and
a resin film is located in parts of the positive lead electrode and the negative lead electrode.

2. A nonaqueous electrolyte battery according to claim 1, wherein the positive electrode is composed of the positive active material layer being applied to a positive electrode current collector,
the negative electrode is composed of the negative active material layer being applied to a negative electrode current collector, and
neither positive active material layer nor negative active material layer is applied to an outermost periphery of the wound electrode assembly.

3. A nonaqueous electrolyte battery according to claim 1, wherein a lead electrode is located in a certain position, which is on an innermost part near the center part of the wound electrode assembly, of the positive electrode and/or the negative electrode.

4. A nonaqueous electrolyte battery according to claim 3, wherein the positive electrode is composed of the positive active material layer being applied to a positive electrode current collector,
the negative electrode is composed of the negative active material layer being applied to a negative electrode current collector, and
neither positive active material layer nor negative active material layer is applied to a position of the lead electrode.

5. A nonaqueous electrolyte battery according to claim 1, wherein the nonaqueous electrolyte is a gel electrolyte.

6. A nonaqueous electrolyte battery according to claim 1, wherein the separator has a first segment and a second segment which are separated by the center part, wherein
the positive electrode on the first area and the negative electrode on the second area are respectively laminated, and
the first segment almost faces the second segment.

7. A nonaqueous electrolyte battery according to claim 6, wherein, at least one of the ends of the segments facing each other in the center part is covered with the separator or an insulating material.

8. A method for manufacturing a nonaqueous electrolyte battery which comprises a wound electrode assembly where one substantially seamless separator, a positive electrode having a positive active material layer, and a negative electrode having a negative active material layer are wound, and a nonaqueous electrolyte with which at least the separator is impregnated, comprising the steps of:
locating the positive electrode having the positive active material layer in a first area which extends from a center part to a first end of the wound electrode assembly on a first side of the separator; locating the negative electrode having the negative active material layer in a second area which extends from the center part to a second end of the wound electrode assembly on a second side of the separator; and winding the separator which has the positive electrode and the negative electrode thereon around the center part to form the wound electrode assembly.

9. A method for manufacturing a nonaqueous electrolyte battery according to claim 8,
wherein the positive active material layer is applied to a positive electrode current collector to form the positive electrode,
the negative active material layer is applied to a negative electrode current collector to form the negative electrode, and
neither positive active material layer nor negative active material layer is applied to an outermost periphery of the wound electrode assembly.

10. A method for manufacturing a nonaqueous electrolyte battery according to claim 8, wherein a lead electrode is located in a certain position, which is on an innermost part near the innermost center part of the wound electrode assembly, of the positive electrode and/or the negative electrode.

11. A method for manufacturing a nonaqueous electrolyte battery according to claim 10,
wherein the positive active material layer is applied to a positive electrode current collector to form the positive electrode,
the negative active material layer is applied to a negative electrode current collector to form the negative electrode, and
neither positive active material layer nor negative active material layer is applied to a position of the lead electrode.

12. A method for manufacturing a nonaqueous electrolyte battery according to claim 8, wherein a gel electrolyte is used as the nonaqueous electrolyte.

13. A method for manufacturing a nonaqueous electrolyte battery according to claim 8,
wherein the separator is separated into a first segment and a second segment at the center part before winding the separator, on which the positive electrode on the first area and the negative electrode on the second area are respectively laminated, an end of the first segment and an end of the second segment are located to almost face each other, and the first and second segments are wound around the center part to form the wound electrode assembly.

14. A method for manufacturing a nonaqueous electrolyte battery according to claim 13, wherein at least one of the ends of the segments facing each other in the center part is covered with the separator or an insulating material.

15. A method for manufacturing a nonaqueous electrolyte battery according to claim 8, wherein using a jig having a slit in a center thereof which the separator is held through, the center part of the separator is tightly held through the slit, the separator is wound and bound around the jig to form the wound electrode assembly and the jig is removed from the wound electrode assembly after the winding.

16. A nonaqueous electrolyte battery comprising:
a wound electrode assembly and a non aqueous electrolyte, wherein the wound electrode assembly comprises:
a separator impregnated with the nonaqueous electrolyte,
a positive electrode having a positive active material layer located in a first area of the wound electrode assembly,
a negative electrode having the negative active material layer located in a second area of the wound electrode assembly, and
a center part between the first area and second area around which the separator is wound, wherein,
the first area extends from the center part toward a first end of the wound electrode assembly on a first side of the separator, and
the second area extends from the center part toward a second end of the wound electrode assembly on a second side of the separator.

* * * * *